US012467279B2

(12) United States Patent
Lin

(10) Patent No.: US 12,467,279 B2
(45) Date of Patent: Nov. 11, 2025

(54) MEMORY COMBINATION LOCK

(71) Applicant: Yu-Pin Lin, Tainan (TW)

(72) Inventor: Yu-Pin Lin, Tainan (TW)

( * ) Notice: Subject to any disclaimer, the term of this patent is extended or adjusted under 35 U.S.C. 154(b) by 209 days.

(21) Appl. No.: 18/495,772

(22) Filed: Oct. 27, 2023

(65) Prior Publication Data

US 2025/0137293 A1 May 1, 2025

(51) Int. Cl.
*E05B 37/02* (2006.01)

(52) U.S. Cl.
CPC .................................... *E05B 37/02* (2013.01)

(58) Field of Classification Search
CPC ...... E05B 37/02; E05B 37/0058; E05B 37/04; Y10T 70/7299; Y10T 70/7305; Y10T 70/7288; Y10T 70/7412; Y10T 70/7418
USPC .......................................... 70/331, 332, 312
See application file for complete search history.

(56) References Cited

U.S. PATENT DOCUMENTS

| | | | | |
|---|---|---|---|---|
| 5,636,539 A * | 6/1997 | Tsai | E05B 37/02 70/315 |
| 5,899,099 A * | 5/1999 | Tsai | E05B 37/10 70/30 |
| 6,209,368 B1 * | 4/2001 | Lee | E05B 37/025 70/315 |
| 6,386,005 B1 * | 5/2002 | Kuo | E05B 37/025 70/30 |
| 6,422,051 B1 * | 7/2002 | Kuo | E05B 67/003 70/323 |
| 6,845,643 B2 * | 1/2005 | Tsai | E05B 37/0031 70/315 |
| 2010/0192641 A1 * | 8/2010 | Nave | E05B 67/22 70/284 |
| 2017/0114567 A1 * | 4/2017 | Taylor | E05B 37/0058 |

FOREIGN PATENT DOCUMENTS

| | | | |
|---|---|---|---|
| CN | 115263085 B * | 12/2023 | E05B 37/02 |
| DE | 102014109224 A1 * | 1/2016 | E05B 37/0058 |
| WO | WO-2010118805 A1 * | 10/2010 | E05B 37/02 |

* cited by examiner

*Primary Examiner* — Suzanne L Barrett
*Assistant Examiner* — Suzanne D Barrett

(57) ABSTRACT

A memory combination lock including a lock base, a set knob, a stopper, a set of dial units, a spring, a spindle, and an upper case. The set of dial units is composed of several rotary disks and several lock bushings. Each of the lock bushings is respectively inserted inside of the rotary disks. Each of the lock bushing has a big through hole and a small through hole with an opening disposed therein. A corresponding groove which position is responding to one of the ten digits (0~9) on each of the rotary discs respectively is designed on the outer wall surface of ten different types of the lock bushings. Therefore, a set of inner code can be formed by different types of the locking bushings inside of the combination lock and the code can be used to retrieve the password in case of forgetting.

8 Claims, 17 Drawing Sheets

MEMORY COMBINATION LOCK

BACKGROUND OF THE PRESENT INVENTION

Field of Invention

The present invention relates to a memory combination lock, in particular to a combination lock structure that can retrieve the original set code.

Description of Related Arts

The combination lock is a type of lock commonly used on door locks, bicycle locks, suitcases, safes and other items. The lock can be opened without a matching key to prevent from the trouble caused by the key losing when opening the lock. However, general combination locks do not have a design for users to retrieve the correct code. When users forget the code, they must blindly attempt different combinations based on their impression, or directly destroy the lock. In doing so, the lock becomes unusable. Alternatively, users can seek the assistance of a professional locksmith to decode, allowing it to be used again. However, this method is time-consuming and labor-intensive, and users often need to pay extra costs, thus causing trouble in use.

A conventional combination lock generally includes a lock shell and a dial units. The set of the dial units is arranged in the lock shell. The set of the dial units is composed of a spindle, a plurality of lock bushings, and a plurality of rotary disks. The lock bushing is arranged on the spindle and can limit the expansion and contraction of the spindle. The hole in the middle of the lock bushing has a gap for the protrusion on the spindle to pass through, and the rotary disk is arranged on the lock bushing and can rotate together with the lock bushing. When the rotary disk is spun, the lock bushing can rotate relative to the spindle. When spinning the rotary disks on the combination lock to the set code, the gaps on each of the lock bushings will be arranged in a row, which can release the axial limit between the lock bushing and the spindle, allowing the protrusion of the spindle to pass through the gap in the lock bushing and slide axially in the lock bushing, thereby unlocking the spindle. However, in order to facilitate the assembly of each of the lock bushings and each of rotary disks, the conventional dial units has a corresponding groove on the outer wall surface of each of lock bushings as a mark, which is convenient for the assembler to align and assemble. Moreover, the gaps and grooves of each of lock bushings are set at the same position, which is convenient to manufacture and assemble, but it is easy to be deciphered. The deciphering method is as shown in the video on the internet (how to pick a realtor lock box: https://www.V=JM44uRI3rLo), a thin-plate probing tool is used to extend into the aperture between the rotary disk and the lock shell, so that the end of the probing tool is pressed against the outer peripheral surface of the lock bushing, and then by rotating the rotary disk and sensing whether the probe tool sinks, and when the probing tool sinks, it can be inferred that it is the groove part of the lock bushing. Then follow this principle to peek into the grooves of the next lock bushing one by one. After all the grooves of the lock bushings are aligned, the gaps of all the locking bushings will also be aligned. Then move all the rotary disks one by one to drive the lock bushings to rotate together until the gap of each of lock bushings aligns with the protrusion on the spindle. The protrusion of the spindle can pass through the gap in the lock bushing and move axially within the lock bushing, thereby unlocking the spindle. This video is published on the internet, so that most combination locks can be easily cracked.

SUMMARY OF THE PRESENT INVENTION

The main purpose of the present invention is to provide a memory combination lock that can effectively solve the drawbacks of conventional combination locks during use.

The memory combination lock of the present invention includes:

a lock base, wherein the lock base has an accommodating groove arranged thereon, the lock base has a recessed groove provided at one end thereof, the accommodating groove of the lock base has a first protruding body protruding therein at a position corresponding to the recessed groove, an inner wall of the recessed groove has a first through hole disposed thereon and two insertion slots oppositely disposed thereon, the first through hole and the two insertion slots are connected with the accommodating groove, the lock base has a notch disposed thereon and connected with the first through hole, the accommodating groove of the lock base has a second protruding body located inwardly at a position corresponding to the first protruding body, the second protrusion has a second through hole disposed therein, the second through hole has a slot disposed thereon;

a set knob, located in the recessed groove of the lock base, wherein the set knob has a convex lump disposed on an outer end surface thereof, the convex lump has a cut slot arranged thereon, the set knob has a restricting protrusion additionally provided on the outer end surface thereof, the set knob has two guide cut slots arranged oppositely on the other end thereof, and one side of the two guide cut slots is set as an arc cut surface;

a stopper, sleeved on the first protruding body of the lock base, wherein the stopper has a through-hole disposed thereon, the stopper has two guide tabs protruding from one end thereof oppositely, the two guide tabs are respectively inserted into the two insertion slots of the lock base and are arranged in the two guide cut slots of the set knob, the opposite side edges of the two guide tabs are formed as arc surfaces, the stopper has positioning cut slots relatively arranged on a wall thereof, and one of the positioning cut slots is aligned with the notch of the lock base;

a set of dial units, arranged in the accommodating groove of the lock base, wherein the set of dial units is composed of several rotary disks, and several lock bushings, each of rotary disks has ten digits (0~9) evenly surrounding an outer wall thereof, a plurality of positioning stuck slots arranged around one end of an inner wall surface thereof, has a recessed slot provided at the other end thereof, and a penetration hole disposed in the middle thereof, each of the lock bushings, respectively located in the rotary disks, has a large diameter wall and a small diameter wall respectively provided on an outer wall surface thereof which means the small diameter wall is penetrated through the penetration hole of the rotary disk, and a big through hole and a small through hole respectively provided therein which means the small through hole has an opening disposed thereon, the lock bushings can be designed in ten types with a corresponding groove on the outer wall surface thereof respectively corresponding to the positions of the ten digits (0~9) on the rotary disks, the openings and corresponding grooves on the lock bushings can respond to the positions of the ten digits on the rotary disks, the lock bushing has several position protrusions arranged on the small diameter wall thereof for being clamped in the positioning stuck slots of the rotary disk;

a spring, sleeved on the second protruding body of the lock base;

a spindle, passed through the stopper and the set of dial units, wherein the spindle has a push block protrudingly disposed thereon, the push block has a limiting convex strip provided on one side thereof, and the limiting convex strip has several cut grooves provided thereon; and an upper case, covered on the lock base, wherein the upper case has a chute for the push block of the spindle to pass through and provided on a top surface thereof, the upper case has a through opening provided on the top surface thereof corresponding to the position of each of the rotary disks of the dial units respectively, the upper case has a penetration opening provided on one end surface thereof, the penetration opening of the upper case is used for the convex lump of the set knob to pass through, the upper case has an arc groove provided on an inner wall thereof, the arc groove is used for inserting the restricting protrusion of the set knob.

According to the memory combination lock of the present invention, the lock base has several protrusions equidistantly disposed in the accommodating groove thereof, wherein a limiting groove is formed between the protrusion and the protrusion for positioning in order to locate the rotary disks.

According to the memory combination lock of the present invention, the lock base has a positioning groove provided at a bottom thereof, wherein the upper case has a positioning inlay disposed on an inner wall surface thereof corresponding to the positioning groove of the lock base.

According to the memory combination lock of the present invention, the positions of the corresponding grooves of the ten types of lock bushings are respectively: the corresponding groove of the first lock bushing corresponds to the position of the digit (1) on the rotary disk, the corresponding groove of the second lock bushing corresponds to the position of the digit (2) on the rotary disk, the corresponding groove of the third lock bushing corresponds to the position of the digit (3) on the rotary disk, the corresponding groove of the fourth lock bushing corresponds to the position of the digit (4) on the rotary disk, the corresponding groove of the fifth lock bushing corresponds to the position of the digit (5) on the rotary disk, the corresponding groove of the sixth lock bushing corresponds to the position of the digit (6) on the rotary disk, the corresponding groove of the seventh lock bushing corresponds to the position of the digit (7) on the rotary disk, the corresponding groove of the eighth lock bushing corresponds to the position of the digit (8) on the rotary disk, the corresponding groove of the ninth lock bushing corresponds to the position of the digit (9) on the rotary disk, and the corresponding groove of the tenth lock bushing corresponds to the position of the digit (0) on the rotary disk.

According to the memory combination lock of the present invention, the corresponding groove of the lock bushing is provided on the small diameter wall of the lock bushing.

According to the memory combination lock of the present invention, the corresponding groove of the lock bushing is provided on the large diameter wall of the lock bushing.

According to the memory combination lock of the present invention, the set of dial units is composed of several rotary disks, several lock bushings and several limit plates, wherein the limit plates is respectively provided on one side of each of the rotary disks, a part of the limit plate is disposed in the recessed slot of each of the rotary disks, each of the limit plates has an passing hole disposed in the middle thereof, an inlay, protrudingly from in the passing hole thereof, is embedded in the corresponding groove of each of the lock bushings, and an indicating protruding piece protruding from the outer peripheral wall thereof at a position corresponding to the inlay.

According to the memory combination lock of the present invention, the upper case has corresponding marks arranged between the through openings on the top surface thereof.

According to the memory combination lock of the present invention, the upper case has a lock serial number arranged thereon.

The advantage of the memory combination lock of the present invention is that each combination lock is equipped with a set of inner codes by utilizing the different corresponding positions of the openings and corresponding grooves of the lock bushings made of ten types. Even if a thief peeks into the corresponding groove on the lock bushing in the combination lock, he/she still cannot guess the location of the openings and cannot unlock it, which can indeed achieve the anti-theft effect. Moreover, each combination lock has its own inner codes, which can be used to retrieve its unlocking password, ensuring the safety of the lock.

DETAILED DESCRIPTION OF THE PREFERRED EMBODIMENT

Figure 1:
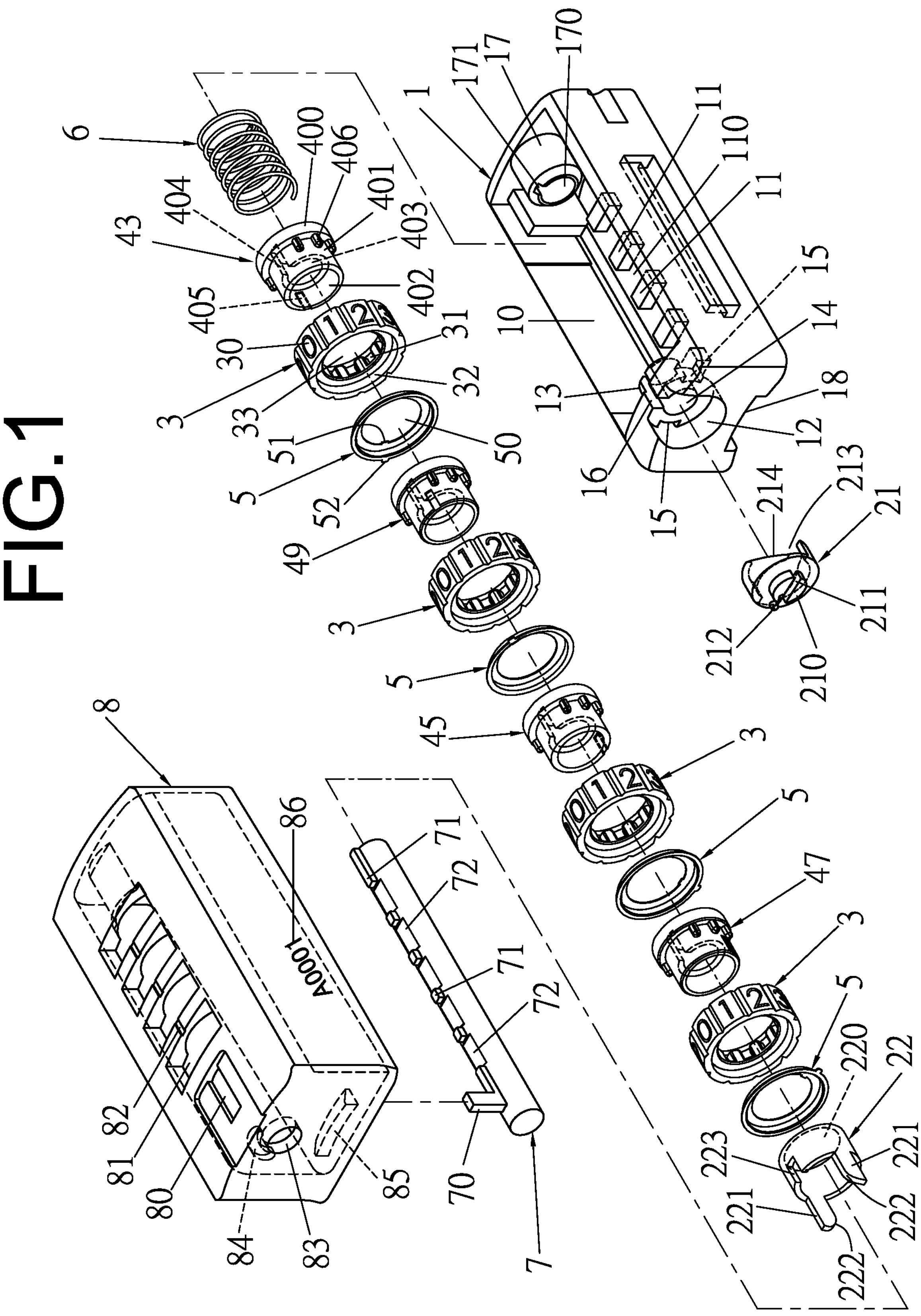
FIG. 1 is an exploded perspective view of an embodiment of the present invention.
Figure 2:
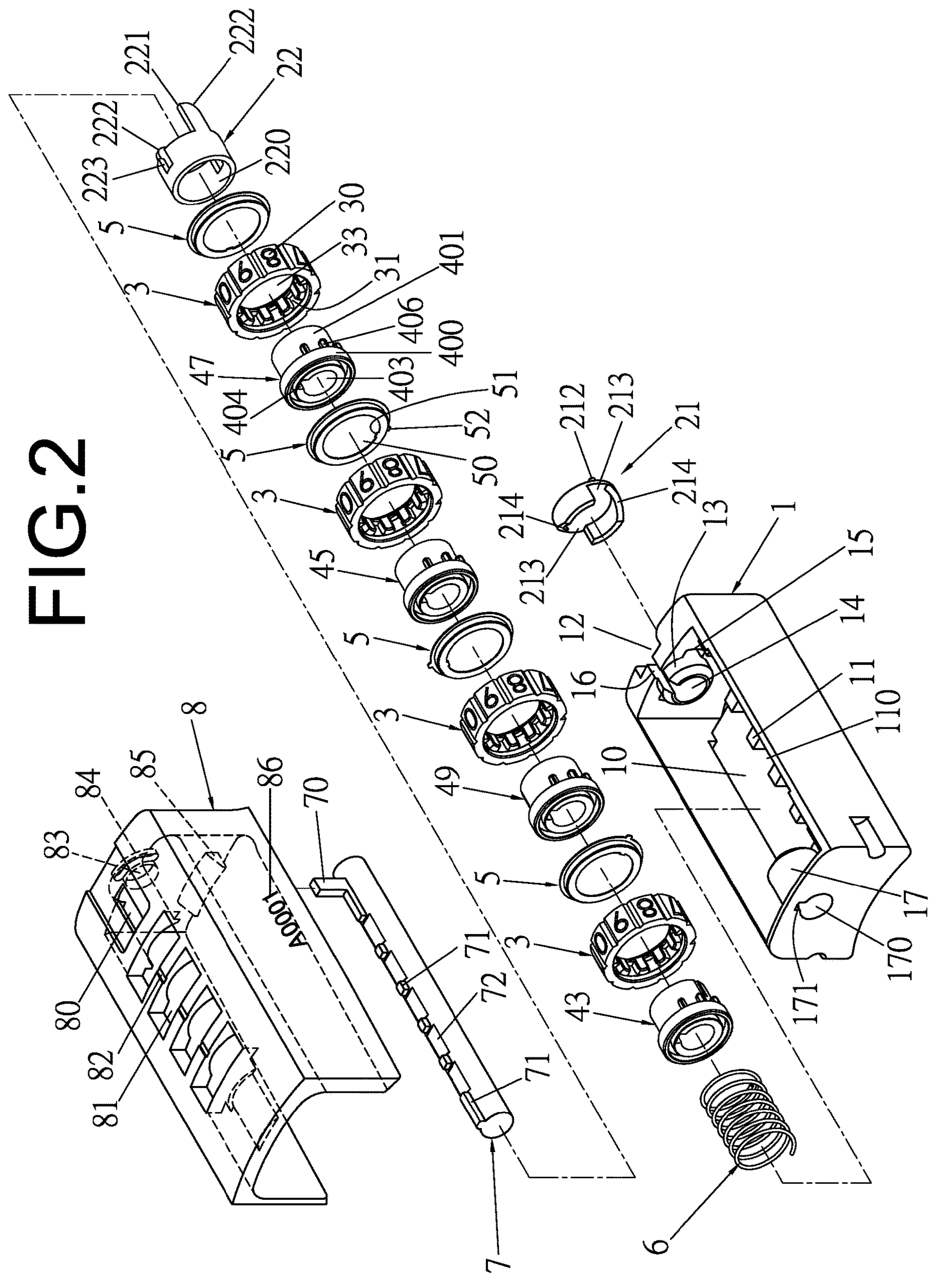
FIG. 2 is an exploded perspective view from another angle of the embodiment of the present invention.
Figure 3:
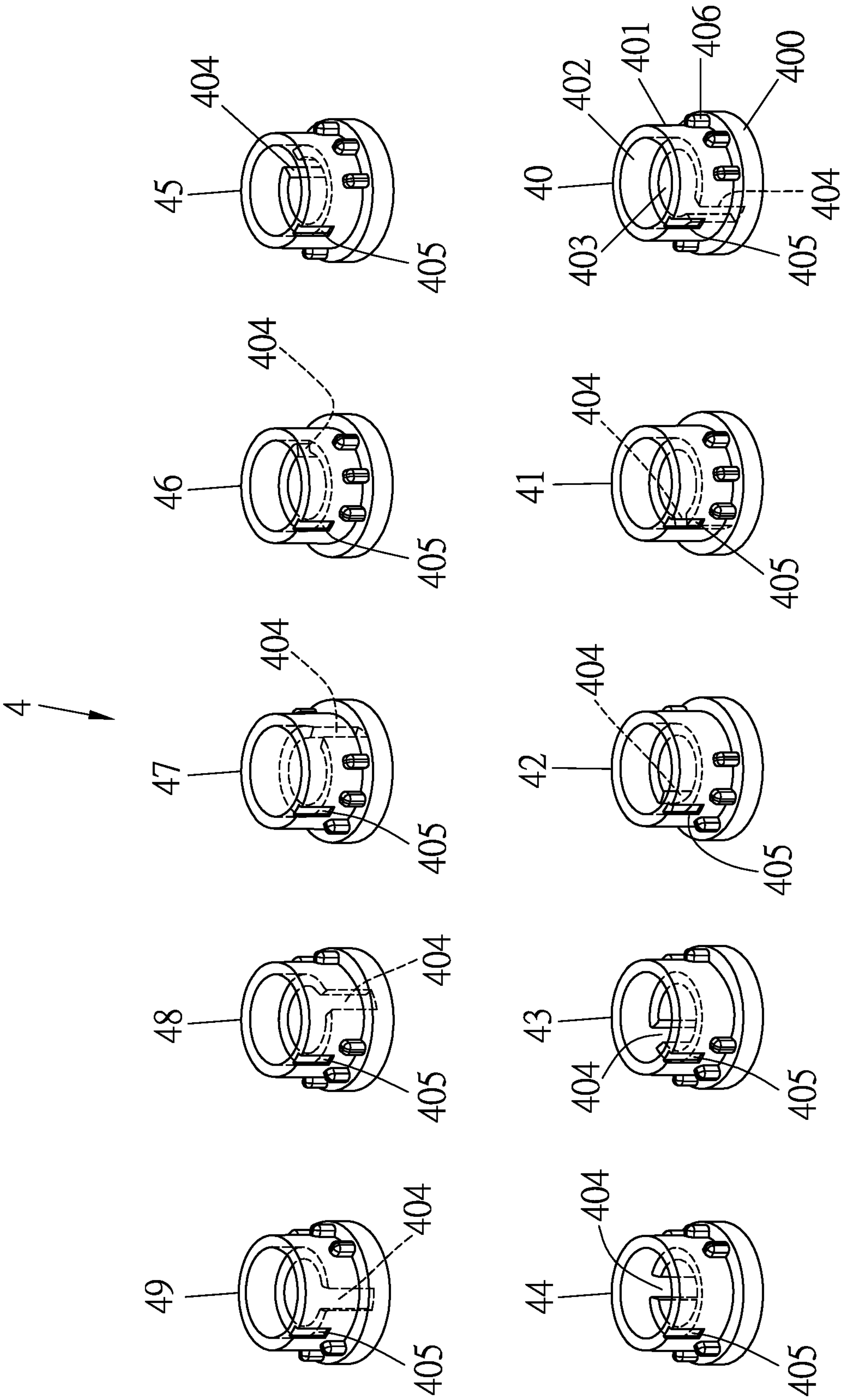
FIG. 3 is a perspective view of each of the lock bushings according to the embodiment of the present invention.
Figure 4:
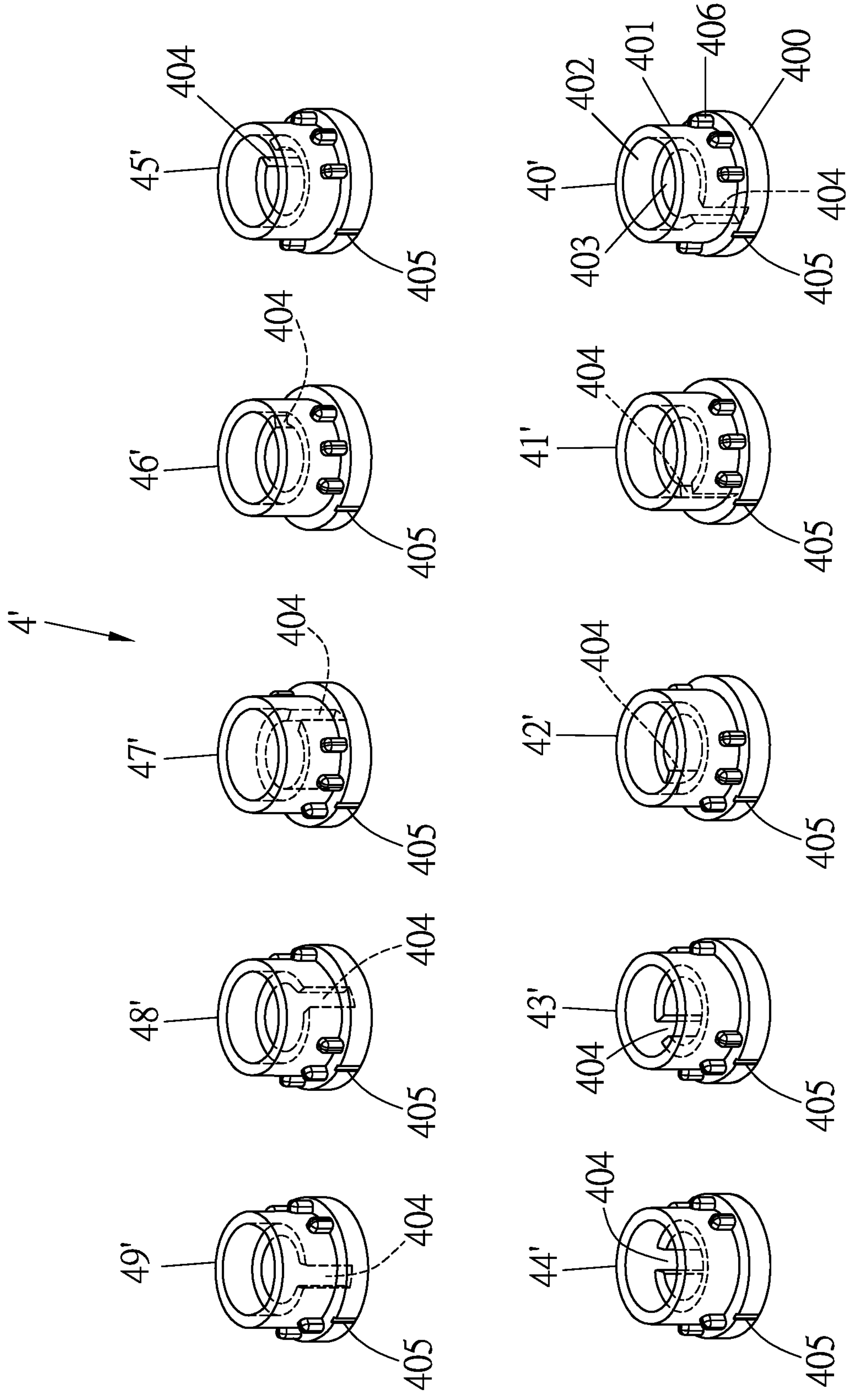
FIG. 4 is another perspective view of each of the lock bushings according to the embodiment of the present invention.
Figure 5:
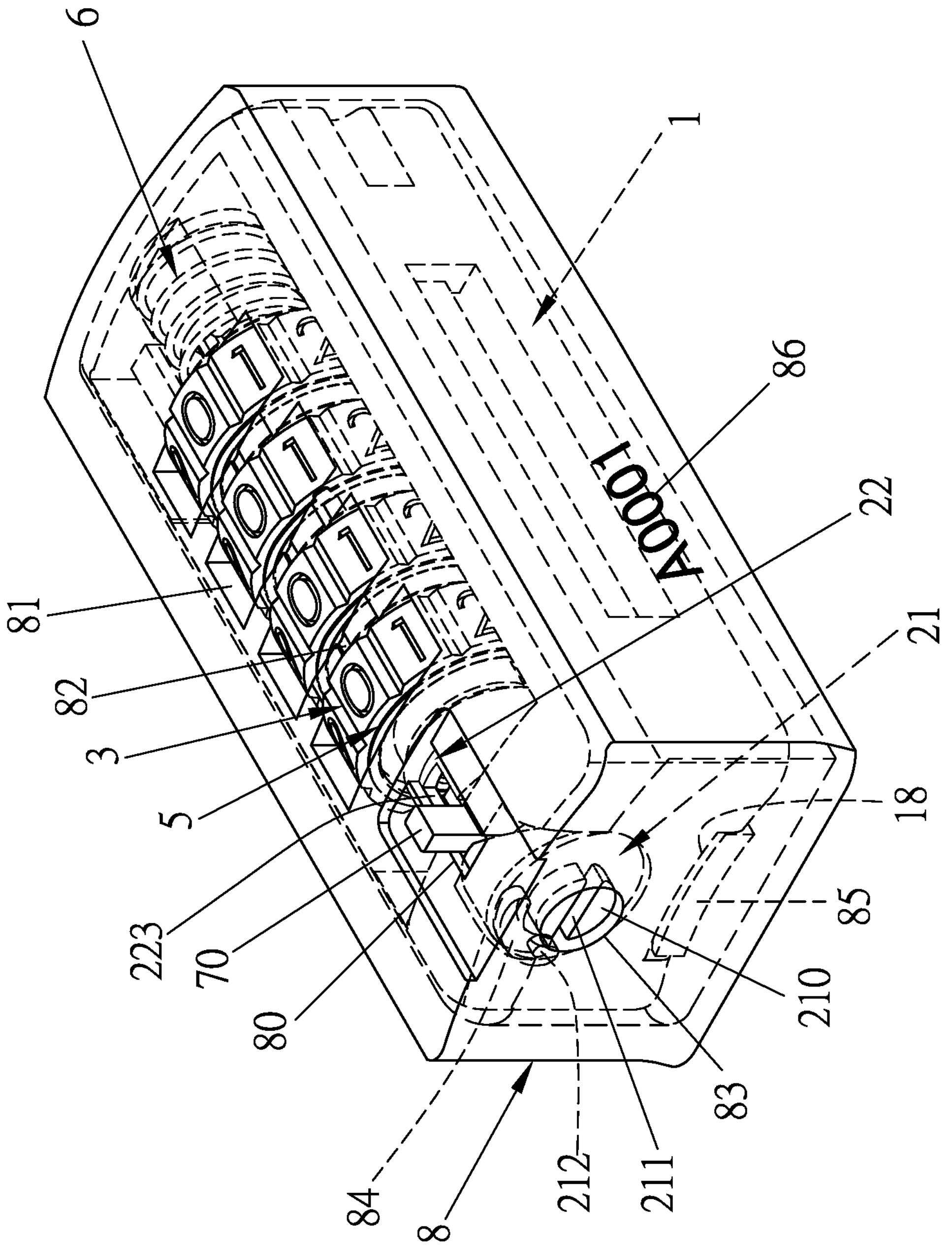
FIG. 5 is a perspective assembly view of the embodiment of the present invention.

In order to achieve the above-mentioned objects and effects of the present invention, the technical means adopted are hereby enumerated through a preferred feasible embodiment, and illustrated in the drawings, detailed as follows:

According to an embodiment of the present invention, please refer to FIGS. 1-4, a memory combination lock mainly includes: a lock base 1, wherein the lock base 1 has an accommodating groove 10 arranged thereon, the accommodating groove 10 has several protrusions 11 equidistantly arranged thereon, a limiting groove 110 is formed between the protrusion 11 and the protrusion 11, the lock base 1 has a recessed groove 12 provided at one end thereof, the accommodating groove 10 of the lock base 1 has a first protruding body 13 protruding therein at a position corresponding to the recessed groove 12, an inner wall of the recessed groove 12 has a first through hole 14 disposed thereon and two insertion slots 15 oppositely disposed thereon, the first through hole 14 and the two insertion slots 15 are connected with the accommodating groove 10, the lock base 1 has a notch 16 disposed thereon and connected with the first through hole 14, the accommodating groove 10 of the lock base 1 has a second protruding body 17 located inwardly at a position corresponding to the first protruding body 13, the second protrusion 17 has a second through hole 170 disposed therein, the second through hole 170 has a slot 171 disposed thereon, the lock base 1 has a positioning groove 18 provided at a bottom thereof; a set knob 21, located in the recessed groove 12 of the lock base 1, wherein the set knob 21 has a convex lump 210 disposed on an outer end surface thereof, the convex lump 210 has a cut slot 211 arranged thereon, the set knob 21 has a restricting protrusion 212 additionally provided on the outer end surface thereof, the set knob 21 has two guide cut slots 213 arranged oppositely on the other end thereof, one side of the two guide cut slots 213 is set as an arc cut surface 214; a stopper 22, arranged in the accommodating groove 10 of the lock base 1 and sleeved on the first protruding body 13, wherein the stopper 22 has a through-hole 220 disposed thereon, the stopper 22 has two guide tabs 221 protruding from one end thereof oppositely, the two guide tabs 221 are respectively inserted into the two insertion slots 15 of the lock base 1 and are arranged in the two guide cut slots 213 of the set knob 21, the opposite side edges of the two guide tabs 221 are formed as arc surfaces 222, the stopper 22 has positioning cut slots 223 relatively arranged on a wall thereof, and one of the positioning cut slots 223 is aligned with the notch 16 of the lock base 1; a set of dial units, arranged in the accommodating groove 10 of the lock base 1, wherein the set of the dial units is composed of several rotary disks 3, several lock bushings 4 and several limit plates 5, each of the rotary disks 3 has ten digits 30 (0~9) evenly surrounding the outer wall thereof, each of the rotary disks 3 has a plurality of positioning stuck slots 31 arranged around one end of an inner wall surface thereof, each of rotary disks 3 has a recessed slot 32 provided at the other end thereof, each of rotary disks 3 has a penetration hole 33 disposed in the middle thereof, each of the lock bushings 4 is respectively located in each of rotary disks 3, the lock bushing 4 has a large diameter wall 400 and a small diameter wall 401 respectively provided on the outer wall surface thereof, the small diameter wall 401 is penetrated through the penetration hole 33 of the rotary disk 3, the lock bushing 4 has a big through hole 402 and a small through hole 403 respectively provided therein, the small through hole 403 has an opening 404 disposed thereon, the lock bushing 4 can be produced in ten types with a corresponding groove 405 provided on the small diameter wall 401 thereof respectively corresponding to a position of one out of the ten digits 30 (0~9) on the rotary disk 3 (as shown in FIG. 3), the openings 404 and corresponding grooves 405 on the ten types of lock bushings 4 are the corresponding positions of the ten digits 30 on the rotary disks 3 (as shown in FIGS. 3 and 4), the lock bushing 4 has several position protrusions 406 arranged on the small diameter wall 401 thereof for being clamped in the positioning stuck slots 31 of the rotary disk 3, wherein the positions of the corresponding grooves 405 of the ten types of lock bushings 4 are respectively: the corresponding groove 405 of the first lock bushing 41 corresponds to the position of the digit (1) on the rotary disk 3, the corresponding groove 405 of the second lock bushing 42 corresponds to the position of the digit (2) on the rotary disk 3, the corresponding groove 405 of the third lock bushing 43 corresponds to the position of the digit (3) on the rotary disk 3, the corresponding groove 405 of the fourth lock bushing 44 corresponds to the position of the digit (4) on the rotary disk 3, the corresponding groove 405 of the fifth lock bushing 45 corresponds to the position of the digit (5) on the rotary disk 3, the corresponding groove 405 of the sixth lock bushing 46 corresponds to the position of the digit (6) on the rotary disk 3, the corresponding groove 405 of the seventh lock bushing 47 corresponds to the position of the digit (7) on the rotary disk 3, the corresponding groove 405 of the eighth lock bushing 48 corresponds to the position of the digit (8) on the rotary disk 3, the corresponding groove 405 of the ninth lock bushing 49 corresponds to the position of the digit (9) on the rotary disk 3, and the corresponding groove 405 of the tenth lock bushing 40 corresponds to the position of the digit (0) on the rotary disk 3, wherein the corresponding groove 405 of the lock bushing 4 can also be provided on the large diameter wall 400 of the lock bushing 4' (as shown in FIG. 4, which is another embodiment of the lock bushing), as shown in the same way as FIG. 3, the corresponding groove 405 of the first lock bushing 41' corresponds to the position of the digit (1) on the rotary disk 3, the corresponding groove 405 of the second lock bushing 42' corresponds to the position of the digit (2) on the rotary disk 3, the corresponding groove 405 of the third lock bushing 43' corresponds to the position of the digit (3) on the rotary disk 3, the corresponding groove 405 of the fourth lock bushing 44' corresponds to the position of the digit (4) on the rotary disk 3, the corresponding groove 405 of the fifth lock bushing 45' corresponds to the position of the digit (5) on the rotary disk 3, the corresponding groove 405 of the sixth lock bushing 46' corresponds to the position of the digit (6) on the rotary disk 3, the corresponding groove 405 of the seventh lock bushing 47' corresponds to the position of the digit (7) on the rotary disk 3, the corresponding groove 405 of the eighth lock bushing 48' corresponds to the position of the digit (8) on the rotary disk 3, the corresponding groove 405 of the ninth lock bushing 49' corresponds to the position of the digit (9) on the rotary disk 3, and the corresponding groove 405 of the tenth lock bushing 40' corresponds to the position of the digit (0) on the rotary disks 3, wherein each of limit plates 5 is respectively provided on one side of each of the rotary disks 3, a part of each of limit plates 5 is disposed in the recessed slot 32 of each of the rotary disks 3, each limit plate 5 has an passing hole 50 disposed in the middle thereof, each of the limit plates 5 has an inlay 51 protruding arranged in the passing hole 50 thereof, the inlay 51 is embedded in the corresponding groove 405 of each of lock bushings 4, each limit plate 5 has an indicating protruding piece 52 protruding from the outer peripheral wall thereof at a position corresponding to the inlay 51; a spring 6, arranged in the accommodating groove 10 of the lock base 1 and sleeved on the second protruding body 17 of the lock base 1; a spindle 7, passed through the stopper 22 and the set of dial unit, wherein the spindle 7 has a push block 70 protrudingly disposed thereon, the push block 70 has a limiting convex strip 71 provided on one side thereof, and the limiting convex strip 71 has several cut grooves 72 provided thereon; and an upper case 8, located on the lock base 1, wherein the upper case 8 has a chute 80 for the push block 70 of the spindle 7 to pass through and provided on a top surface thereof, the upper case 8 has a through opening 81 provided on the top surface thereof corresponding to the position of each of rotary disks 3 of the set of dial units, the upper case 8 has corresponding marks 82 arranged between the through openings 81 on the top surface thereof, the upper case 8 has a penetration opening 83 provided on one end surface thereof, the penetration opening 83 of the upper case 8 is used for the convex lump 210 of the set knob 21 to pass through, the upper case 8 has an arc groove 84 provided on an inner wall thereof, the arc groove 84 is used for inserting the restricting protrusion 212 of the set knob 21, the upper case 8 has a positioning inlay 85 disposed on the inner wall face corresponding to the positioning groove 18 of the lock base 1, the upper case 8 has a lock serial number 86 arranged thereon; which is a memory combination lock structure.

Figure 6:
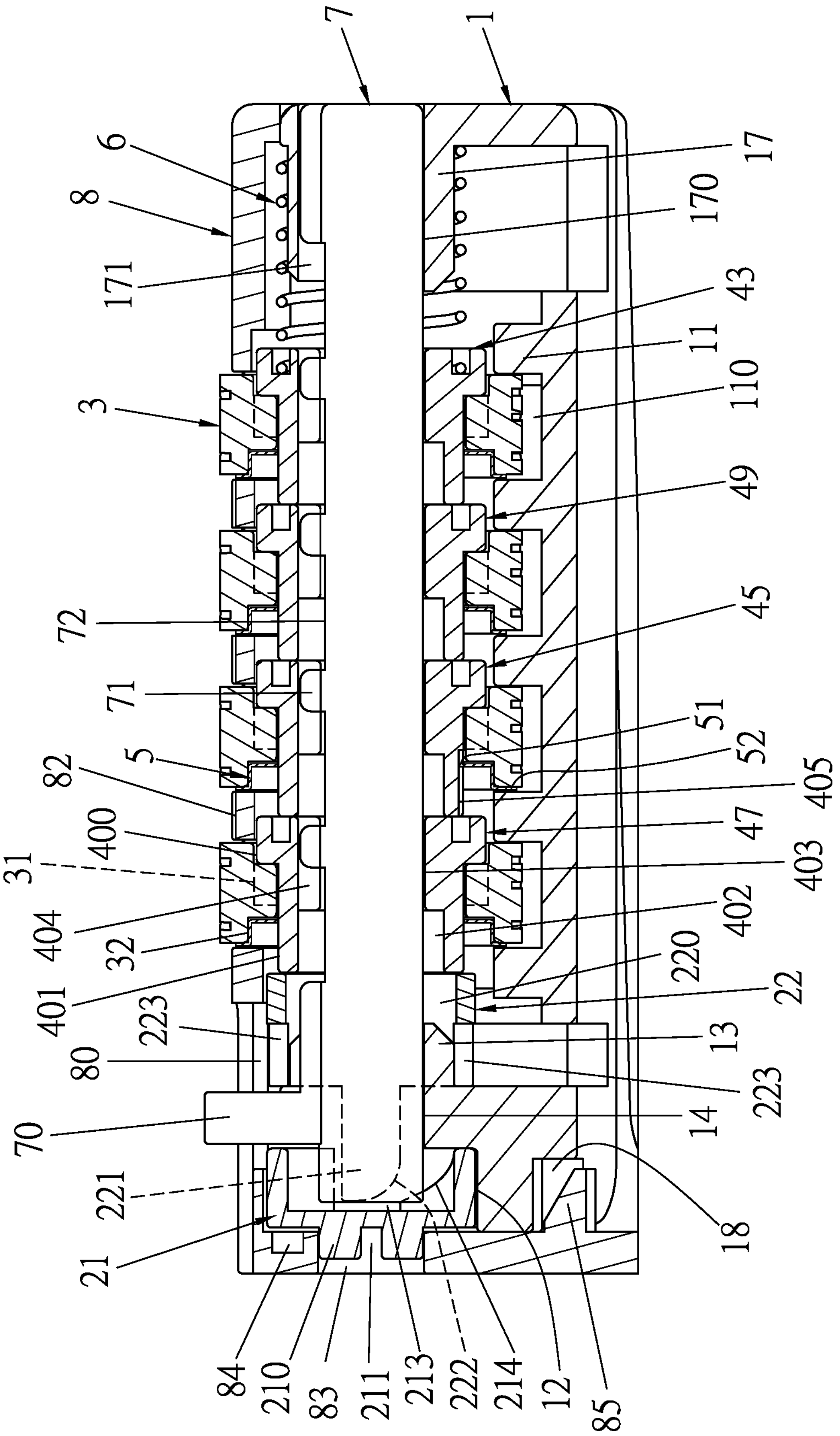
FIG. 6 is a sectional view of the embodiment of the present invention.
Figure 7:
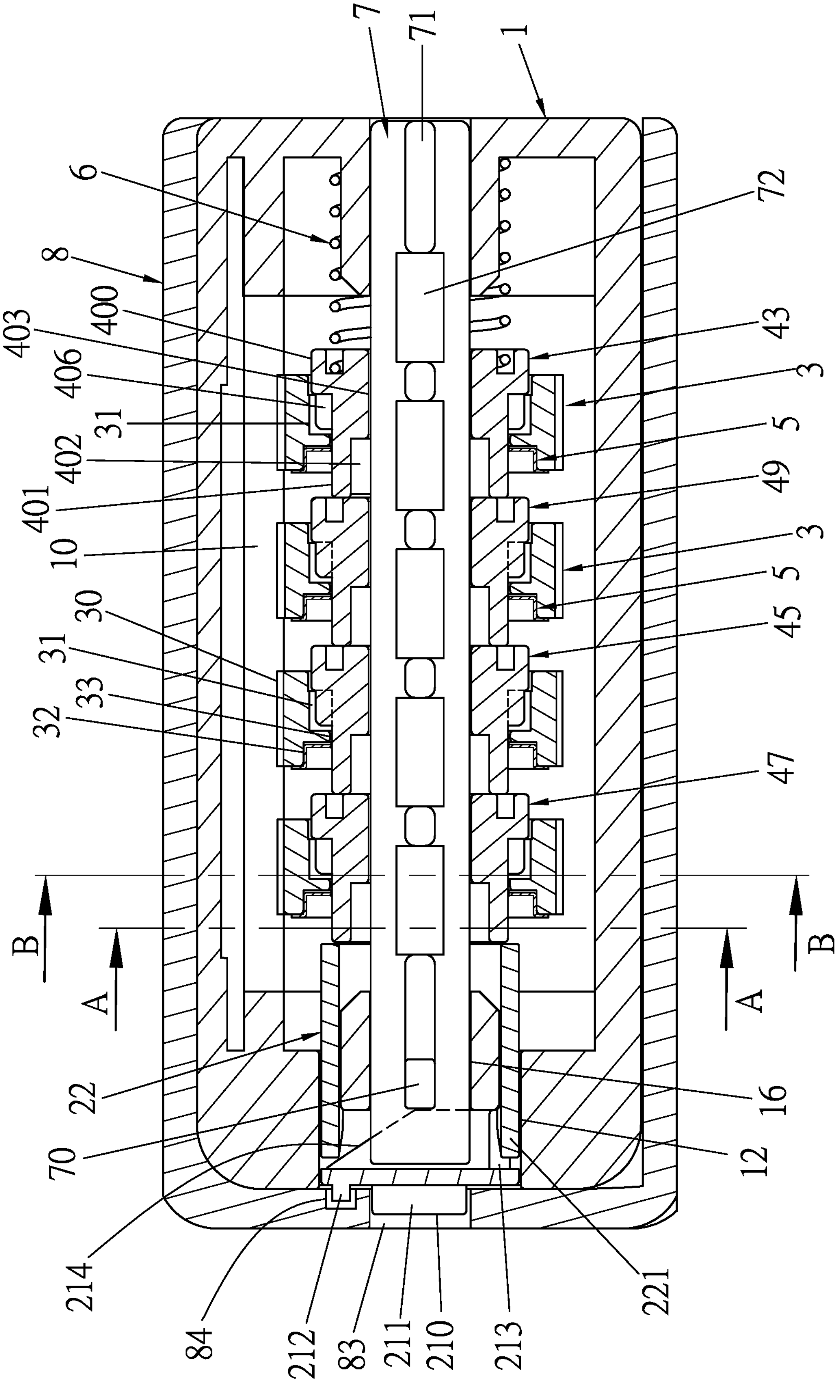
FIG. 7 is a top sectional perspective view of the embodiment of the present invention.
Figure 9:
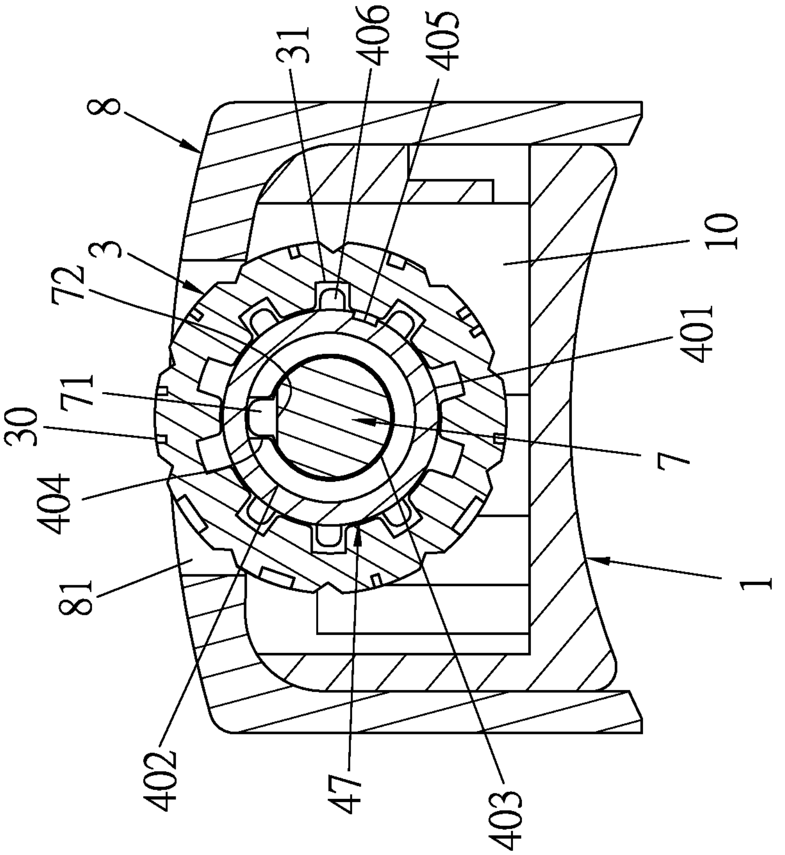
FIG. 9 is a sectional view of B-B in FIG. 7.
Figure 8:
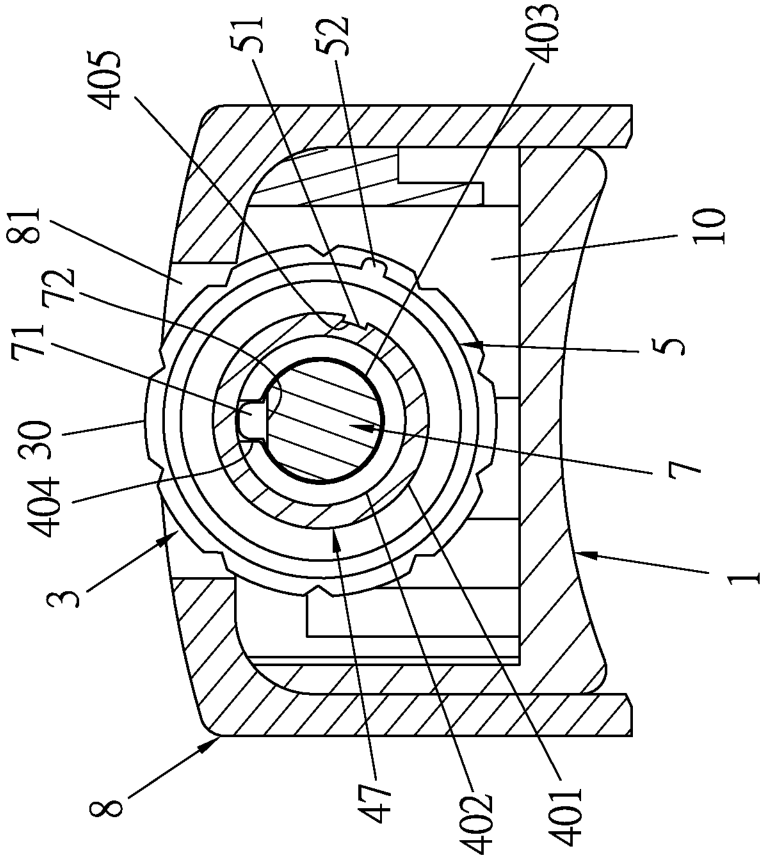
FIG. 8 is a sectional view of A-A in FIG. 7.

When assembling the embodiment of the present invention, as shown in FIGS. 1 to 9, each memory combination lock has a lock serial number 86 arranged on the upper case 8, and each of the lock serial number 86 is provided with a set of "inner codes". The "inner codes" are set by the manufacturing company during assembly, which can choose three or four lock bushings 4. This embodiment has four lock bushings 4, and the four selected lock bushings 4 are the "inner codes" of the lock. The positions of the corresponding grooves 405 on the four selected lock bushings 4 can be different or the same, for example: as shown in FIGS. 1 and 2 of this embodiment, the seventh lock bushing 47, the fifth lock bushing 45, the ninth lock bushing 49 and the third lock bushing 43 in FIG. 3 are selected. The positions of the corresponding grooves 405 of the four lock bushings 4 are the "inner codes" of the lock (the inner codes from left to right are "7, 5, 9, 3" respectively). The four lock bushings 4 are respectively assembled in the four rotary disks 3, and the openings 404 of each lock bushings 4 correspond to the topmost digit 30 on each of the rotary disk 3. (The password number set in this embodiment is at the "0" position, and the digit on rotary disk 3 is the "outer code". A set of outer codes of this embodiment is "0, 0, 0, 0", which is the "unlock password" of the combination lock). The small diameter wall 401 of each lock bushing 4 extends through the penetration hole 33 of each of rotary disks 3. The position protrusions 406 on each of lock bushings 4 are embedded in the positioning stuck slots 31 of each of rotary disks 3 (as shown in FIGS. 7 and 9). In addition, the four limit plates 5 are respectively provided on one side of the four rotary disks 3, the small diameter wall 401 of the lock bushing 4 is extended through the passing hole 50 of the limit plate 5, and the inlay 51 of each of the limit plates 5 is embedded in the corresponding groove 405 of each of the lock bushings 4. (If the lock bushing 4' of another embodiment of FIG. 4 is assembled, each of the limit plates 5 is assembled on the other side of each of the rotary disks 3, the large diameter wall 400 of the lock bushing 4' is extended in the passing hole 50 of the limit plate 5, and the inlay 51 of each limit plate 5 is embedded in the corresponding groove 405 of each of the lock bushings 4'). The stopper 22 is located in front of the leftmost lock bushing 4. The spindle 7 is inserted into the big through hole 402 and the small through hole 403 of each of the lock bushings 4 through the through-hole 220 of the stopper 22. The limiting convex strip 71 on the spindle 7 corresponds to the opening 404 of each of the lock bushings 4. One end of the spring 6 is placed against the rightmost lock bushing 4. Then set the spindle 7, the stopper 22 and the set of the dial units as set above together with the spring 6 into the accommodating groove 10 of the lock base 1. The other end of the spring 6 is sleeved on the second protruding body 17 of the lock base 1. The left end of the spindle 7 is inserted into the first through hole 14 of the lock base 1. The push block 70 of the spindle 7 protrudes from the notch 16 of the lock base 1. The right end of the spindle 7 is inserted into the second through hole 170 of the lock base 1. The two guide tabs 221 of the stopper 22 are respectively inserted into the two insertion slots 15 of the lock base 1. The lower end of each of the rotary disks 3 is respectively located in each of the limiting grooves 110 of the lock base 1. In addition, set knob 21 is assembled in the recessed groove 12 of the lock base 1, and the two guide tabs 220 of the stopper 22 are respectively located in the guide cut slots 213 of the set knob 21, and then place the upper case 8 on the lock base 1, so that the positioning inlay 85 of the upper case 8 is embedded in the positioning groove 18 of the lock base 1. The convex lump 210 of the set knob 21 corresponds to the penetration opening 83 of the upper case 8. The restricting protrusion 212 of the set knob 21 is located in the arc groove 84 of the upper case 8. The push block 70 of the spindle 7 protrudes from the chute 80 of the upper case 8, and the upper end of each of the rotary disks 3 protrudes from the through opening 81 of the upper case 8. In this way, the assembly of the overall memory combination lock can be completed.

Figure 10:
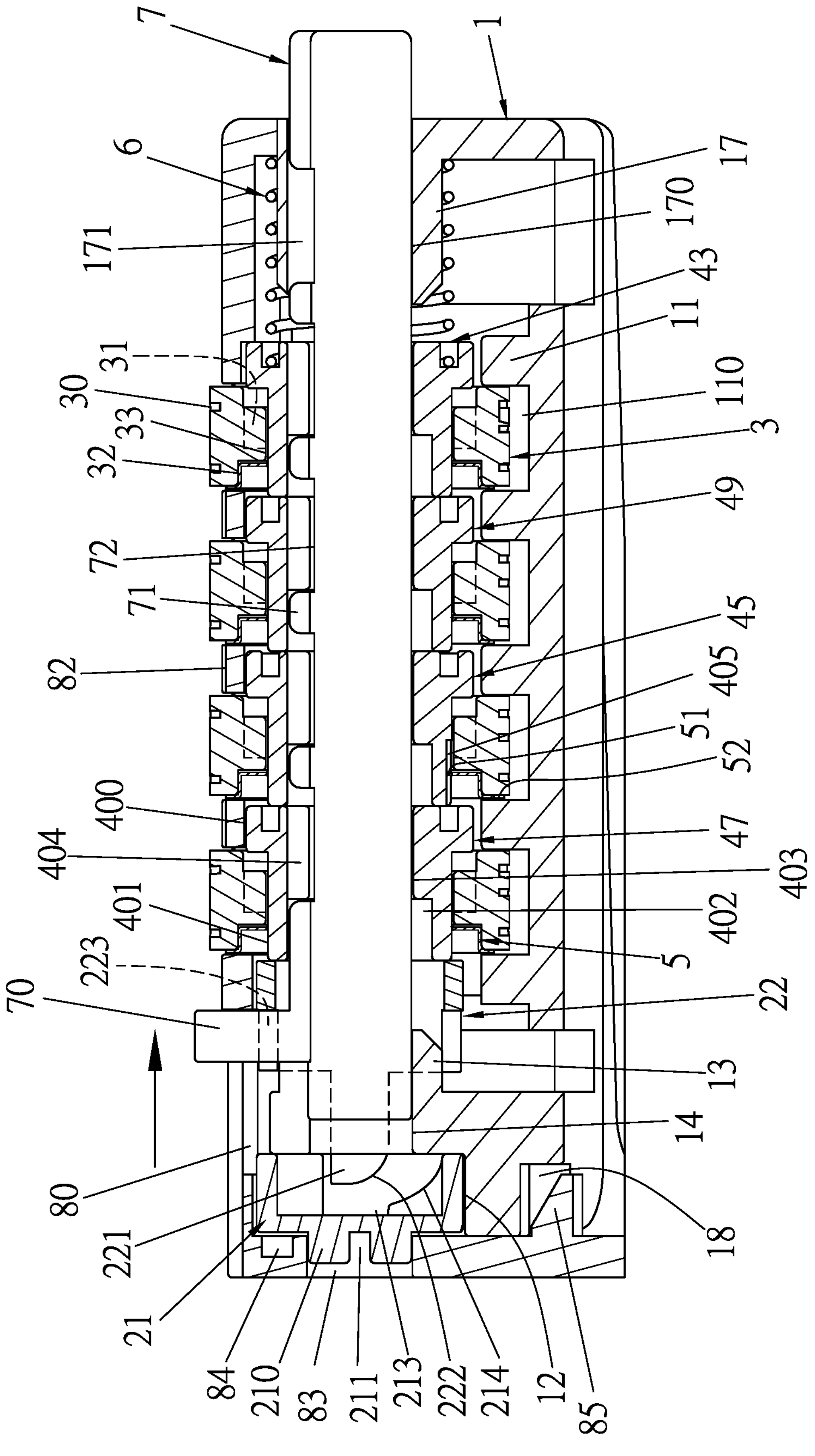
FIG. 10 is a perspective view of pushing a spindle according to the embodiment of the present invention.
Figure 11:
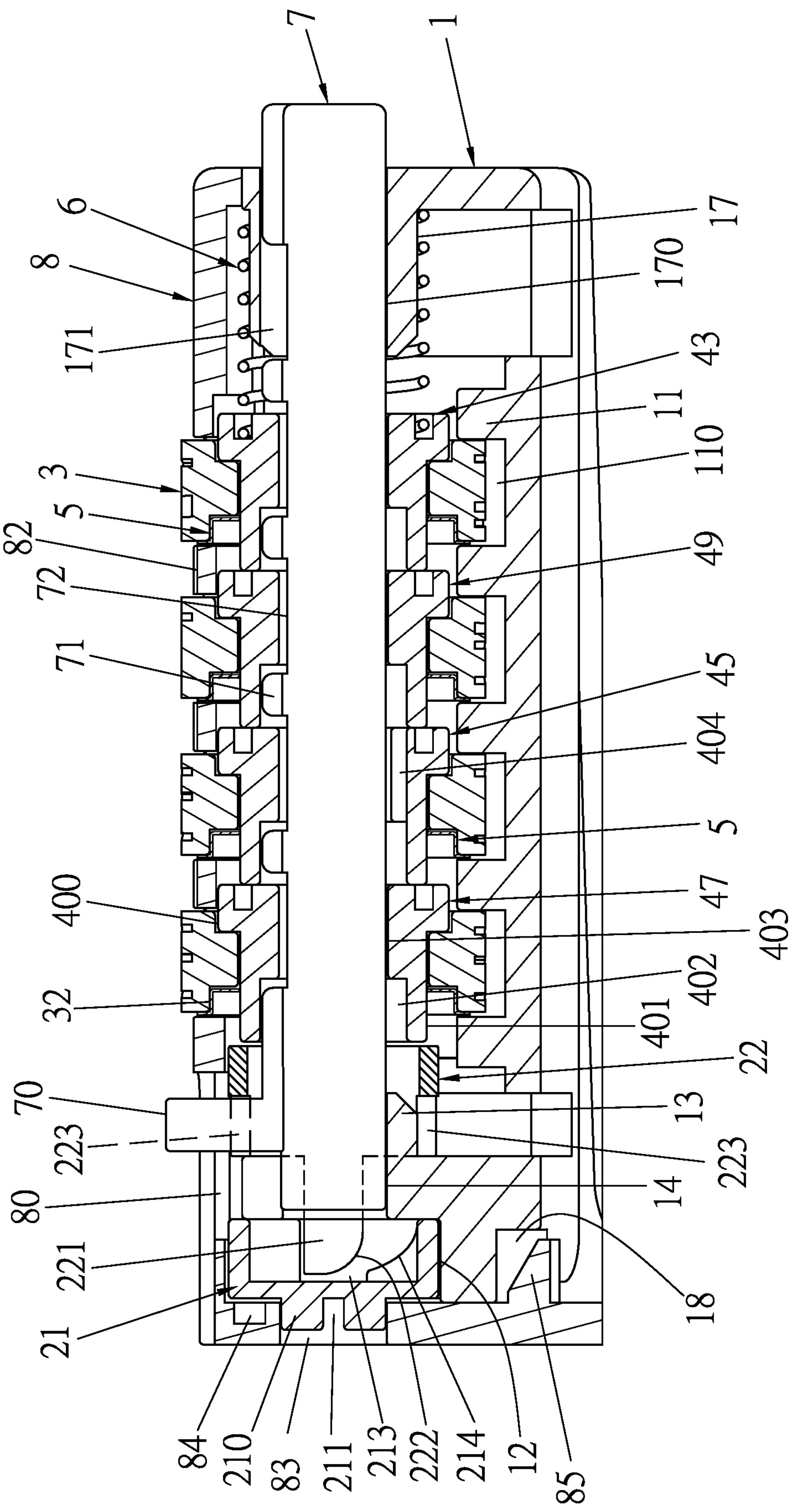
FIG. 11 is a sectional view of the embodiment of the present invention when rotating the rotary disk to drive the lock bushing to lock.

When using the present invention, referring to FIGS. 5 to 11, and assemble the combination lock of the present invention on the items to be locked, such as door locks, bicycle locks, suitcases, safes, etc. When locking, only need to push the push block 70 of the spindle 7 to move (as shown in FIG. 10), one end of the spindle 7 will protrude from the second through hole 170 of the lock base 1. The limiting convex strip 71 of the spindle 7 is separated from the opening 404 of each lock bushings 4 and is no longer restricted by each of the lock bushing 4, and each of the rotary disks 3 can be rotated to generate random numbers. Each of the rotary disks 3 drives the lock bushing 4 to rotate, and the lock bushing 4 drives the limit plate 5 to rotate together, causing the opening 404 of each of the lock bushings 4 to rotate, and no longer align the limiting convex strip 71 of the spindle 7 (as shown in FIG. 11), so that the spindle 7 is locked and not retracted. In this way, the items that need to be locked can be locked, and the locking action is completed. When unlocking, only need to rotate each rotary disks 3 so that the digit 30 on each of rotary disks 3 is the password set for the lock (the unlocking password in this embodiment is "0, 0, 0, 0"). The openings 404 of each of the lock bushings 4 are aligned with each other again, and the openings 404 are aligned with the limiting convex strips 71 of the spindle 7. The spindle 7 is no longer restricted by the lock bushing 4, but can be axially retracted to form an unlocking state (as shown in FIG. 6). In this way, the unlocking action can be completed.

Figure 12:
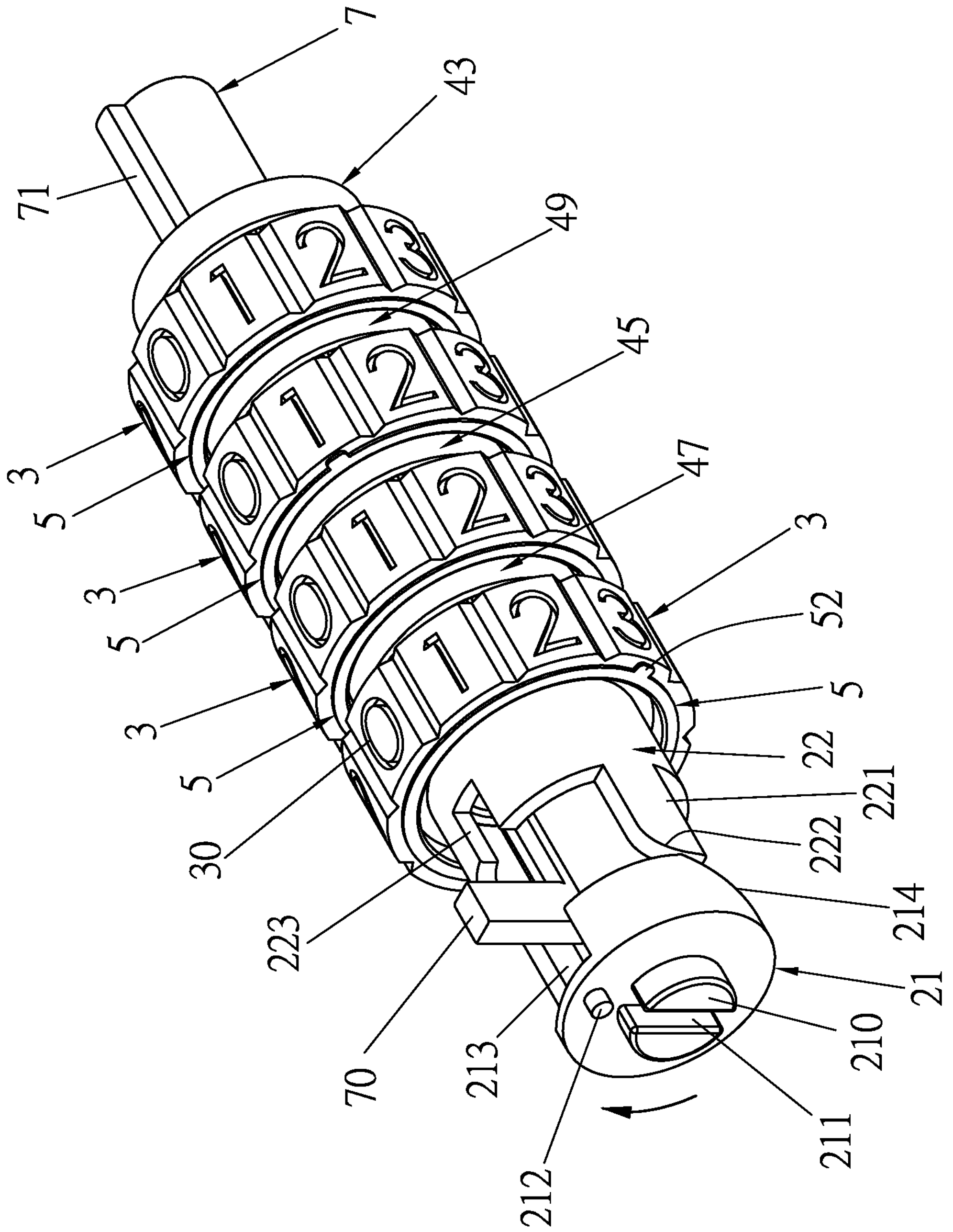
FIG. 12 is two perspective view of a set knob rotated inside the lock according to the embodiment of the present invention.
Figure 13:
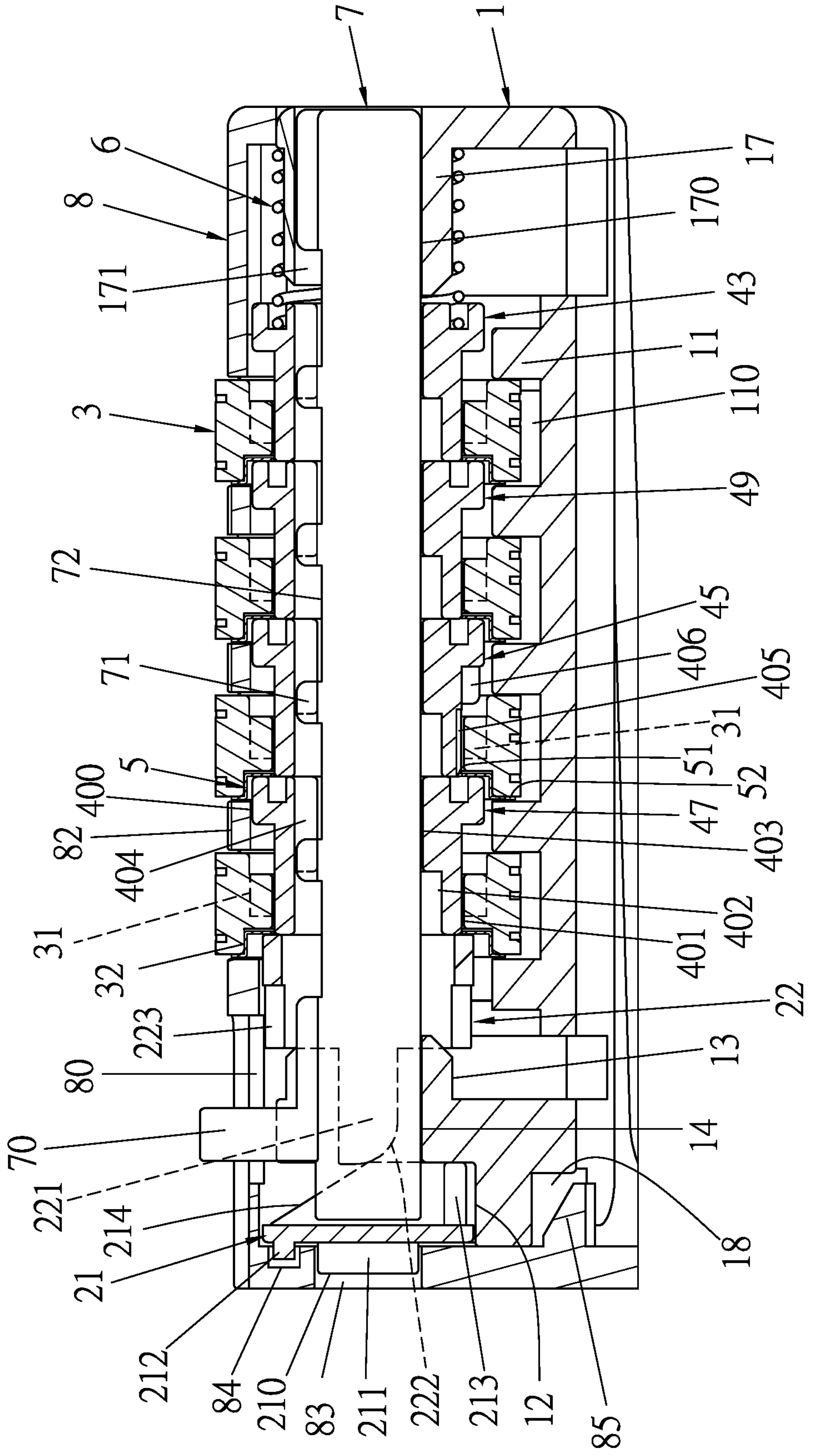
FIG. 13 is a perspective view of rotating a set knob and pushing a lock bushing away from the rotary disk buckle according to an embodiment of the present invention.

When changing the password in the embodiment of the present invention, referring to FIGS. 12 and 13. It is only necessary to insert a tool into the cut slot 211 on the convex lump 210 of the set knob 21 to rotate the set knob 21, and the restricting protrusion 212 on the set knob 21 rotates within the arc groove 84 of the upper case 8. The arc surfaces 222 of the three guide tabs 221 of the stopper 22 is pushed to the right along the arc cut surface 214 of the set knob 21 by the rotation of the set knob 21. The stopper 22 pushes against each of the lock bushings 4 and moves to the right, and pushes against the spring 6 in an elastically compressed state. The position protrusions 406 of each of the lock bushings 4 are separated from the positioning stuck slots 31 of each of the rotary disks 3 (as shown in FIG. 13), so that each of the rotary disks 3 is no longer restricted by the spindle 7 and the lock bushing 4 and can rotate, and the desired password of the lock can be freely set. When each of the rotary disks 3 rotates to the desired password, use a tool to rotate the set knob 21 back to an original position, so that the stopper 22 is no longer blocked by the arc cut surface 214 of the set knob 21, and the spring 6 is elastic recovery (as shown in FIG. 6). Each of the lock bushings 4 and the stopper 22 are axially pushed back to the original position, and the position protrusions 406 of each of lock bushings 4 are again locked in the positioning stuck slots 31 of each of the rotary disks 3. The guide tabs 221 of the stopper 22 are again located in the guide cut slots 213 of the set knob 21. In this way, the code changing setting of the memory combination lock can be completed.

Figure 14:
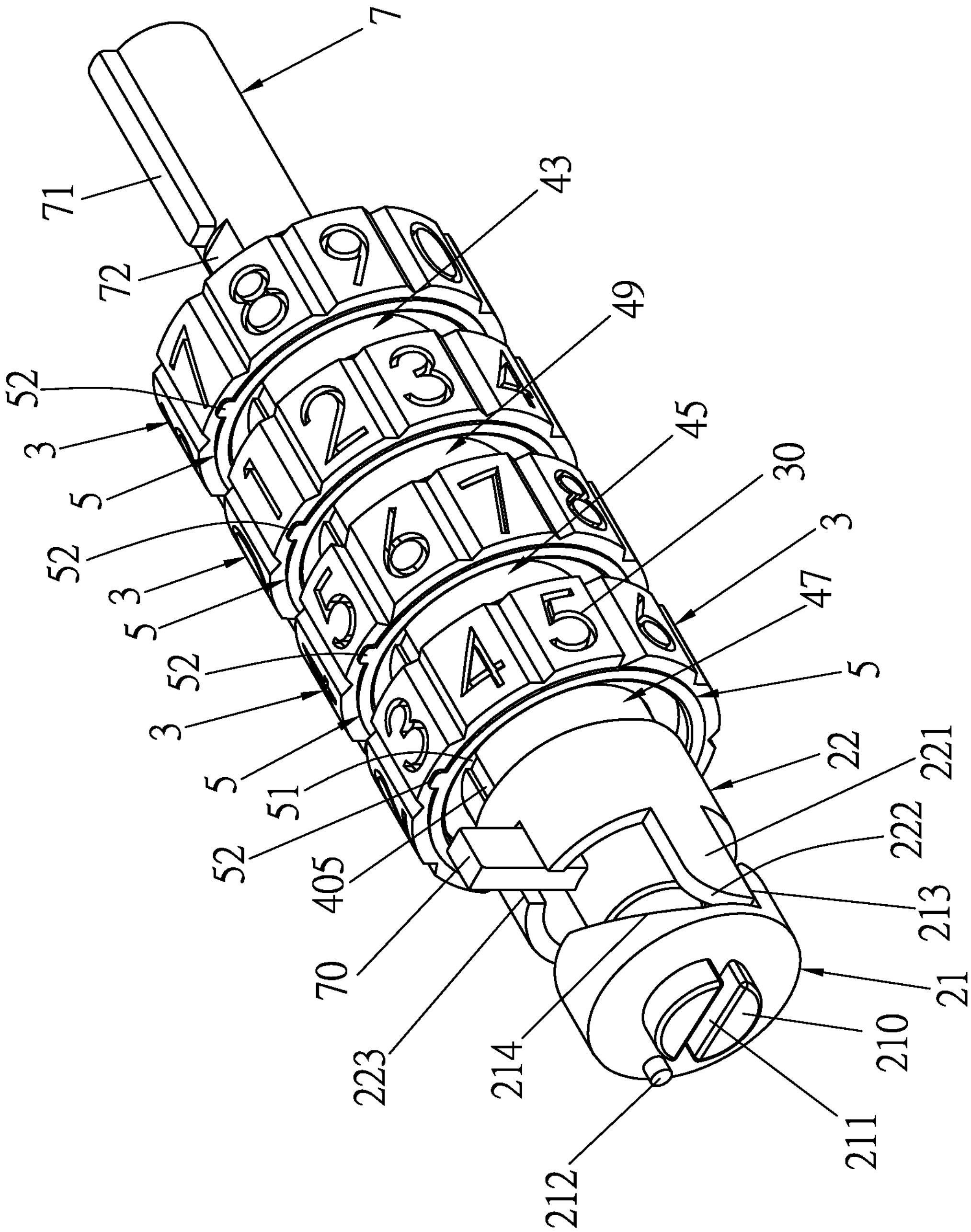
FIG. 14 is an internal perspective view of the embodiment of the present invention in which the indicating protruding pieces of the limit plates are rotated upward to align with each other by rotating the rotary disk.
Figure 15:
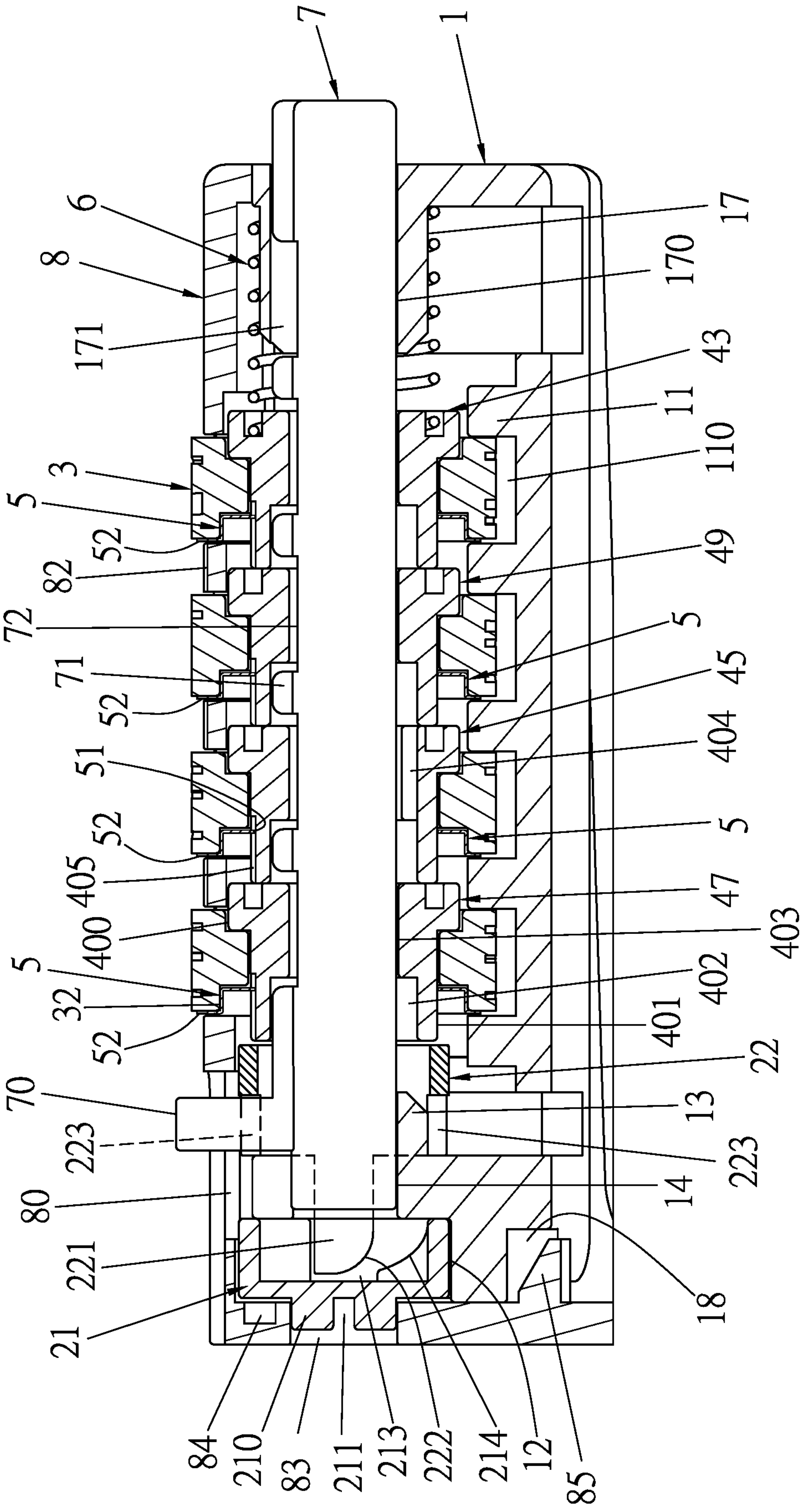
FIG. 15 is a sectional view of each of limit plates aligned upward according to the embodiment of the present invention.
Figure 17:
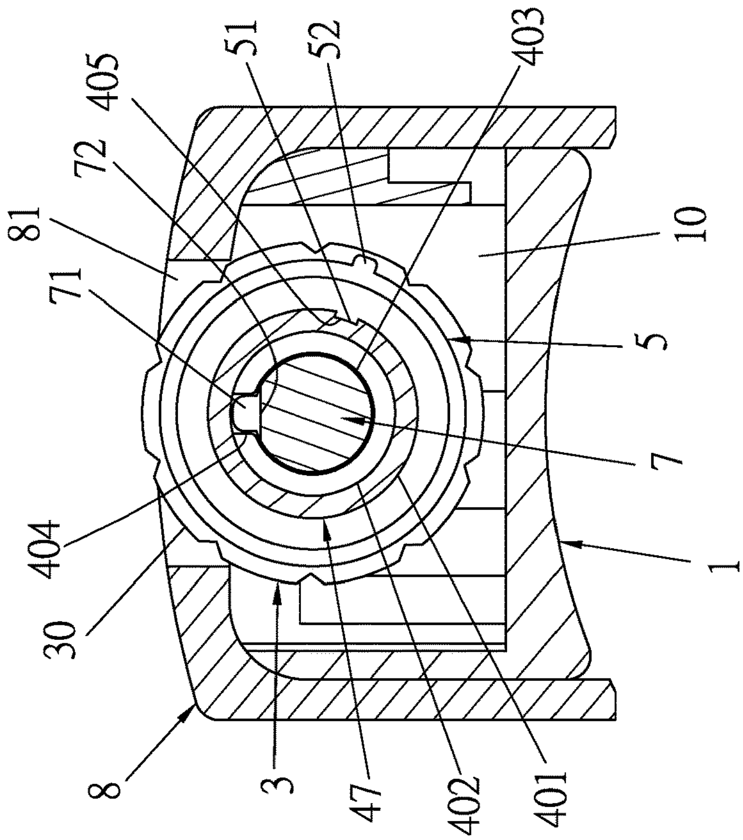
FIG. 17 is a sectional view of FIG. 16 in which the rotary disk is rotated to drive the lock bushing so that the opening is aligned with the limiting convex strip of the spindle to retrieve the original password.
Figure 16:
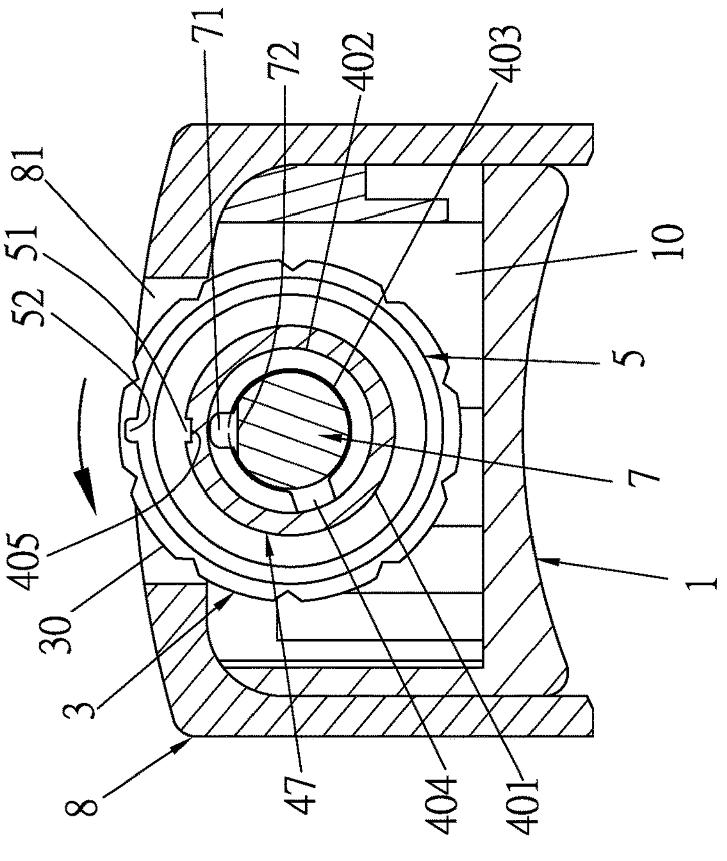
FIG. 16 is an assembled sectional view of the seventh lock bushing of FIG. 14.
Figure 18:
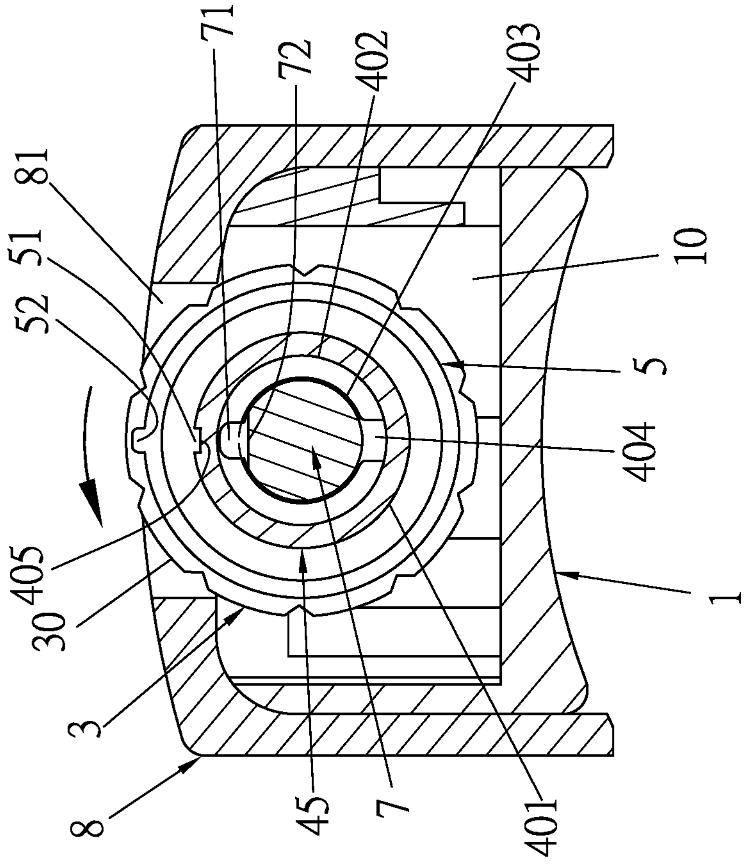
FIG. 18 is an assembled sectional view of the fifth lock bushing of FIG. 14.
Figure 19:
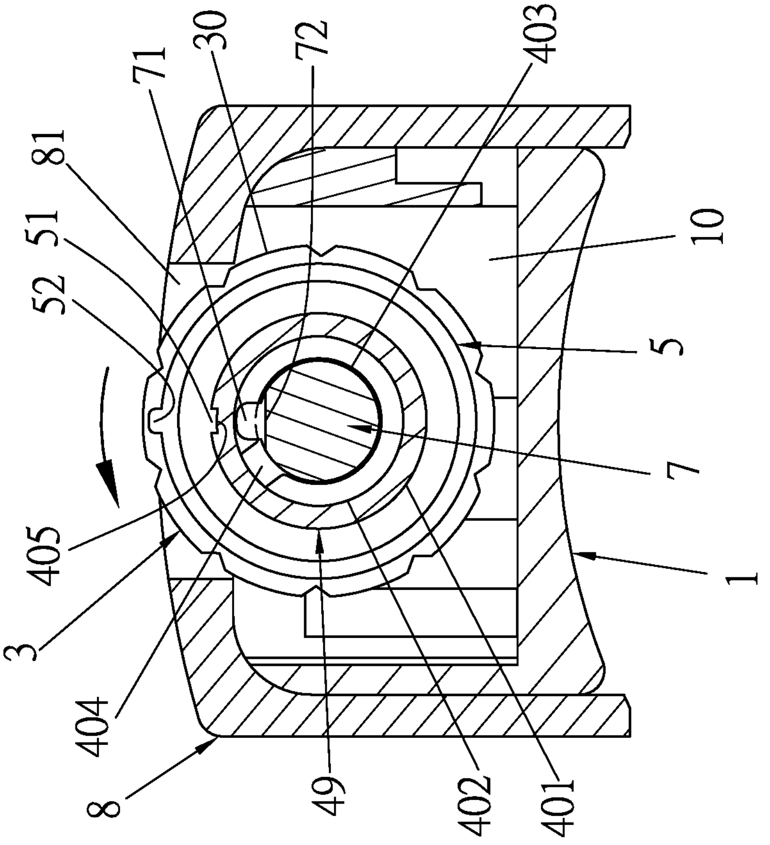
FIG. 19 is an assembled sectional view of the ninth lock bushing of FIG. 14.
Figure 20:
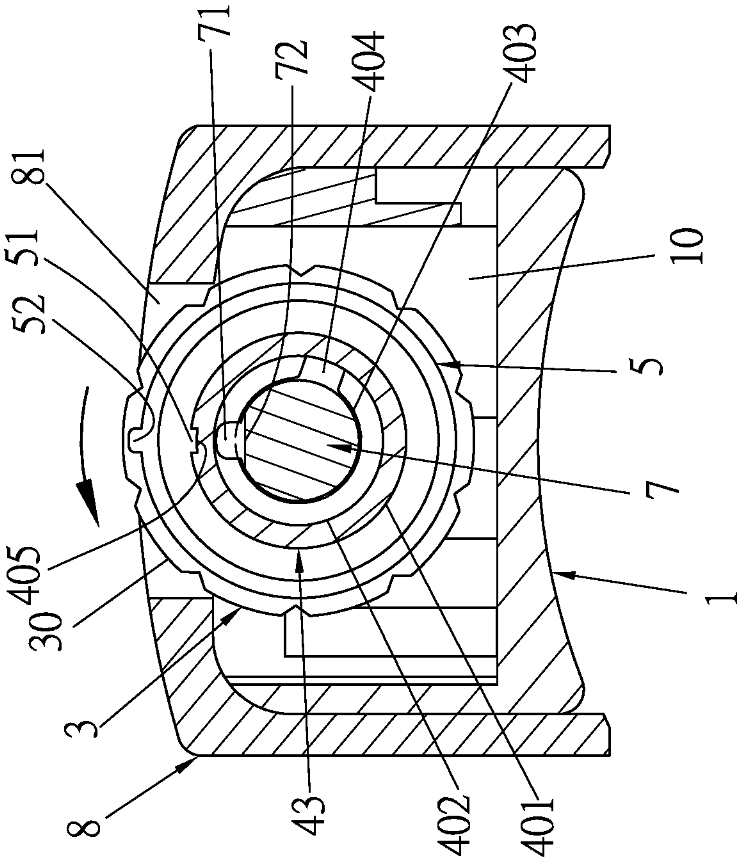
FIG. 20 is an assembled sectional view of the third lock bushing of FIG. 14.

Every memory combination lock of the present invention is provided with a set of "inner codes" with the product. The user can save or record the "inner codes" for emergencies. Consumers can also log in personal information and the lock serial number 86 online. After forgetting the password, they can call the manufacturer or log in online to check the "inner codes" of the memory combination lock. Even after changing the password, the user can successfully retrieve the original password as long as he/she remembers the "inner codes". There is no need to ask a professional to open the lock or destroy the lock, which can achieve the purpose of conveniently opening the lock and protecting the combination lock. If the user forgets the password and wants to retrieve the password of the lock, refer to FIGS. 14 to 20, and only needs to turn each of the rotary disks 3 of the memory combination lock so that each of the rotary disks 3 drives each of the lock bushings 47, 45, 49, and 43 to rotate, and drives each of the limit plates 5 to rotate, and rotate the indicating protruding piece 52 of each of the limit plates 5 corresponding to each of the rotary disks 3 to the top (as shown in FIGS. 14, 15, and 16), so that each of the indicating protruding pieces 52 is aligned with the corresponding marks 82 on the upper case 8. At this time, the digit 30 on each of rotary disks 3 is not the set password, because the corresponding positions of the opening 404 and the corresponding groove 405 of each of the lock bushings 4 are different. Therefore, even if a thief finds the corresponding groove 405 of the lock bushing 4, he/she still cannot know which position the opening 404 of the lock bushing 4 corresponds to. In this way, the user only needs to obtain the "inner codes" of the memory combination lock, align the indicating protruding piece 52 of each of the limit plate 5 with each other, and then sequentially turning each rotary disk 3 to the corresponding position according to the "inner codes" of the memory combination lock, the password can be retrieved. For example: if the "inner codes" of the memory combination lock are "7, 5, 9, 3", then turn the leftmost rotary disk 3 upward (counterclockwise) seven times (as shown in FIGS. 16 and 17), the opening 404 of the lock bushing 47 can be rotated to the position of aligning the limiting convex strip 71 of the spindle 7. Sequentially, turn the second rotary disk 3 on the left upward five times (as shown in FIG. 18), turn the third rotary disk 3 on the left upward nine times (as shown in FIG. 19), and turn the rightmost rotary disk 3 upward three times (as shown in FIG. 20). The opening 404 of each lock bushing 47, 45, 49, and 43 can be aligned with each other to achieve the purpose of retrieving the unlocking code. It can also rotate in the opposite direction, turn the leftmost rotary disk 3 downwards (clockwise) three times. By analogy, turn the second rotary disk 3 on the left downwards five times, the third rotary disk 3 on the left downward once, and the rightmost rotary disk 3 downwards seven times. Rotating each of the rotary disks 3 downwards in sequence the corresponding digit of times to align the opening 404 of each of the lock bushings 47, 45, 49, and 43. In addition, the present invention can also use the sum of the corresponding digits 30 on the rotary disks 3 after alignment of each limit plates 5 and the corresponding "inner codes" to take the single digit to obtain the correct unlocking password. For example, if the digit 30 on rotary disk 3 is (3), the inner code is (7), and the total is "10", taking the single digit, the correct password for rotary disk 3 is "0", so turn the digit 30 on rotary disk 3 to (0). Or if the digit 30 on rotary disk 3 is (8), the inner code is (7), and the total is "15", taking the single digit, the correct password for the rotary disk 3 is "5", so turn the digit 30 on rotary disk 3 to (5) to retrieve the original password. By analogy, the thief cannot guess the "inner codes" of the memory combination lock, which can truly prevent the thief from peeking into the corresponding groove 405 of the lock bushing 4 to unlock the lock. The memory combination lock structure of the present invention, even if the thief detects the corresponding grooves 405 of the lock bushings 4, it is difficult to guess the unlocking password unless the "inner codes" of the memory combination lock is obtained, and it has the effect of truly preventing peeping into unlocking and retrieving the password.

In summary, the present invention has indeed achieved the expected objects and effects, and is more ideal and practical than those in the art. The above-mentioned embodiment is only specific descriptions for the preferred embodiments of the present invention, the embodiment is not intended to limit the scope of the patent application of the present invention, and all other equivalent changes and modifications accomplished without departing from the technical means disclosed in the present invention shall be covered by the present application.

What is claimed is:

1. A memory combination lock, comprising:

a lock base, wherein the lock base has an accommodating groove arranged thereon, the lock base has a recessed groove provided at one end thereof, the accommodating groove of the lock base has a first protruding body protruding therein at a position corresponding to the recessed groove, an inner wall of the recessed groove has a first through hole disposed thereon and two insertion slots oppositely disposed thereon, the first through hole and the two insertion slots are connected with the accommodating groove, the lock base has a notch disposed thereon and connected with the first through hole, the accommodating groove of the lock base has a second protruding body located inwardly at a position corresponding to the first protruding body, the second protrusion has a second through hole disposed therein, the second through hole has a slot disposed thereon;

a set knob, located in the recessed groove of the lock base, wherein the set knob has a convex lump disposed on an outer end surface thereof, the convex lump has a cut slot arranged thereon, the set knob has a restricting protrusion additionally provided on the outer end surface thereof, the set knob has two guide cut slots arranged oppositely on the other end thereof, and one side of the two guide cut slots is set as an arc cut surface;

a stopper, sleeved on the first protruding body of the lock base, wherein the stopper has a through-hole disposed thereon, the stopper has two guide tabs protruding from one end thereof oppositely, the two guide tabs are respectively inserted into the two insertion slots of the lock base and are arranged in the two guide cut slots of the set knob, the opposite side edges of the two guide tabs are formed as arc surfaces, the stopper has positioning cut slots relatively arranged on a wall thereof, and one of the positioning cut slots is aligned with the notch of the lock base;

a set of dial units, arranged in the accommodating groove of the lock base, wherein the set of dial units is composed of several rotary disks, and several lock bushings, each of the rotary disks has ten digits (0~9) evenly surrounding an outer wall thereof, each of the rotary disks has a plurality of positioning stuck slots arranged around one end of an inner wall surface thereof, each of the rotary disks has a recessed slot provided at the other end thereof, each of the rotary disks has a penetration hole disposed in the middle thereof, each of the lock bushings is respectively located in each of the rotary disks, each of the lock bushings has a large diameter wall and a small diameter wall respectively provided on an outer wall surface thereof, the small diameter wall is penetrated through the penetration hole of the rotary disk, each of the lock bushings has a big through hole and a small through hole respectively provided therein, the small through hole has an opening disposed thereon, the lock bushings can be designed in ten types with a corresponding groove on the outer wall surface thereof respectively corresponding to the positions of the ten digits (0~9) on the rotary disks, the openings and corresponding grooves on the ten types of lock bushings are the corresponding positions of the ten digits on the rotary disks, the lock bushing has several position protrusions arranged on the small diameter wall thereof for being clamped in the positioning stuck slots of the rotary disk;

a spring, sleeved on the second protruding body of the lock base;

a spindle, passed through the stopper and the set of the dial units, wherein the spindle has a push block protrudingly disposed thereon, the push block has a limiting convex strip provided on one side thereof, and the limiting convex strip has several cut grooves provided thereon; and an upper case, covered on the lock base, wherein the upper case has a chute for the push block of the spindle to pass through and provided on a top surface thereof, the upper case has a through opening provided on the top surface thereof corresponding to the position of each of the rotary disks of the set of the dial units, the upper case has a penetration opening provided on one end surface thereof, the penetration opening of the upper case is used for the convex lump of the set knob to pass through, the upper case has an arc groove provided on an inner wall thereof, the arc groove is used for inserting the restricting protrusion of the set knob.

2. The memory combination lock, as recited in claim 1, wherein the lock base has several protrusions equidistantly disposed in the accommodating groove thereof, wherein a limiting groove is formed between the protrusion and the protrusion.

3. The memory combination lock, as recited in claim 1, wherein the lock base has a positioning groove provided at a bottom thereof, wherein the upper case has a positioning inlay disposed on an inner wall face thereof corresponding to the positioning groove of the lock base.

4. The memory combination lock, as recited in claim 1, wherein the positions of the corresponding grooves of the ten types of lock bushings are respectively: the corresponding groove of the first lock bushing corresponds to the position of the digit (1) on the rotary disk, the corresponding groove of the second lock bushing corresponds to the position of the digit (2) on the rotary disk, the corresponding groove of the third lock bushing corresponds to the position of the digit (3) on the rotary disk, the corresponding groove of the fourth lock bushing corresponds to the position of the digit (4) on the rotary disk, the corresponding groove of the fifth lock bushing corresponds to the position of the digit (5) on the rotary disk, the corresponding groove of the sixth lock bushing corresponds to the position of the digit (6) on the rotary disk, the corresponding groove of the seventh lock bushing corresponds to the position of the digit (7) on the rotary disk, the corresponding groove of the eighth lock bushing corresponds to the position of the digit (8) on the rotary disk, the corresponding groove of the ninth lock bushing corresponds to the position of the digit (9) on the rotary disk, and the corresponding groove of the tenth lock bushing corresponds to the position of the digit (0) on the rotary disk.

5. The memory combination lock, as recited in claim 1, wherein the corresponding groove of the lock bushing is provided on the small diameter wall of the lock bushing.

6. The memory combination lock, as recited in claim 1, wherein the corresponding groove of the lock bushing is provided on the large diameter wall of the lock bushing.

7. The memory combination lock, as recited in claim 1, wherein the upper case has corresponding marks arranged between the through openings on the top surface thereof.

8. The memory combination lock, as recited in claim 1, wherein the upper case has a lock serial number arranged thereon.

* * * * *